US011222165B1

(12) United States Patent
Ramos et al.

(10) Patent No.: US 11,222,165 B1
(45) Date of Patent: Jan. 11, 2022

(54) SLIDING WINDOW TO DETECT ENTITIES IN CORPUS USING NATURAL LANGUAGE PROCESSING

(71) Applicant: International Business Machines Corporation, Armonk, NY (US)

(72) Inventors: Igor S. Ramos, Round Rock, TX (US); Andrew J. Lavery, Austin, TX (US); Scott Carrier, New Hill, NC (US); Paul Joseph Hake, Madison, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/996,394

(22) Filed: Aug. 18, 2020

(51) Int. Cl.
*G06F 40/166* (2020.01)
*G06F 40/279* (2020.01)

(52) U.S. Cl.
CPC .......... *G06F 40/166* (2020.01); *G06F 40/279* (2020.01)

(58) Field of Classification Search
CPC ............................. G06F 40/166; G06F 40/279
USPC .......................................................... 715/230
See application file for complete search history.

(56) References Cited

U.S. PATENT DOCUMENTS

| | | | | |
|---|---|---|---|---|
| 6,411,932 | B1 * | 6/2002 | Molnar ................... | G09B 19/04 704/254 |
| 8,874,434 | B2 | 10/2014 | Collobert et al. | |
| 10,642,889 | B2 | 5/2020 | Reshef et al. | |
| 2007/0288840 | A1 * | 12/2007 | Girle ..................... | G06F 40/221 715/234 |
| 2008/0162118 | A1 * | 7/2008 | Itoh ........................ | G06F 40/284 704/10 |
| 2009/0216790 | A1 * | 8/2009 | Dexter .................. | G06F 16/951 |
| 2012/0324350 | A1 * | 12/2012 | Rosenblum ........... | G06F 40/166 715/256 |

(Continued)

FOREIGN PATENT DOCUMENTS

EP        1347395 B1     8/2017

OTHER PUBLICATIONS

Euge Inzaugarat; Discovering the essential tools for Named Entities Recognition; May 11, 2019; Towards Data Science; 16 pages.*

(Continued)

*Primary Examiner* — Andrew R Dyer
(74) *Attorney, Agent, or Firm* — Cantor Colburn LLP; Ryan Lewis

(57) ABSTRACT

According to one or more embodiments of the present invention, an input request to a natural language processing (NLP) system is optimized. A window-size is selected for annotating an input corpus. The corpus is divided into partitions of the window-size, each partition processed separately. Further, a first set of entities is identified in a first partition, and a second set of entities in a second partition. Further, a third partition containing a first segment and a second segment is determined. The first segment overlaps the first partition, and the second segment overlaps the second partition. The method further includes identifying a third set of entities in the third partition. In response to the third set of entities being distinct from a set of entities from the first segment and the second segment, the window-size is adjusted. The input request for the NLP system is generated using the adjusted window-size.

20 Claims, 10 Drawing Sheets

(56) References Cited

U.S. PATENT DOCUMENTS

| | | | |
|---|---|---|---|
| 2015/0378988 A1* | 12/2015 | Chewning | G06Q 50/01 |
| | | | 704/9 |
| 2016/0306876 A1* | 10/2016 | Nichols | G06N 7/005 |
| 2017/0322930 A1 | 11/2017 | Drew | |
| 2018/0095980 A1 | 4/2018 | De Francisci Morales et al. | |
| 2018/0300315 A1 | 10/2018 | Leal et al. | |
| 2019/0073354 A1* | 3/2019 | Indenbom | G06F 40/30 |
| 2019/0122136 A1 | 4/2019 | Dirac et al. | |
| 2019/0274567 A1* | 9/2019 | Prasad Agara Venkatesha Rao | A61B 5/726 |

OTHER PUBLICATIONS

Denny Britz; Understanding Convolutional Neural Networks for NLP; Nov. 7, 2015; wildML.com; pp. 1-23.*

Chapuis, B. et al., "An Efficient Type-agnostic Approach for Finding Sub-sequences in Data," Universite de Lausanne, retrieved Jun. 15, 2020, 8 pages; http://www.cs.toronto.edu/~periklis/pubs/dss17.pdf.

* cited by examiner

SLIDING WINDOW TO DETECT ENTITIES IN CORPUS USING NATURAL LANGUAGE PROCESSING

BACKGROUND

The present invention generally relates to computer systems, and more specifically, to detecting entities across data in a corpus that is chunked to adhere to content size restrictions within a natural language processing (NLP) system or process.

NLP is concerned with the interactions between computers and human (natural) languages and how computers process and analyze large amounts of natural language data. This natural language data is sometimes referred to as a corpus or corpora. In linguistics, a corpus or text corpus is a language resource consisting of a large and structured set of texts. NLP processing can occur on large corpora resulting in many annotations associated with the corpora. Semantic search of a corpus denotes searching with meaning, as distinguished from lexical search where the search engine looks for literal matches of the query words or variants of them without understanding the overall meaning of the query. Semantic search seeks to improve search accuracy by understanding the searcher's intent and the contextual meaning of terms as they appear in the searchable dataspace to generate more relevant results. Semantic search systems consider various points including context of search, location, intent, variation of words, synonyms, generalized and specialized queries, concept matching, and natural language queries to provide relevant search results. Some regard semantic search as a set of techniques for retrieving knowledge from richly structured data sources like ontologies. An ontology encompasses a representation, formal naming, and definition of the categories, properties, and relations between the concepts, data, and entities that substantiate one, many, or all domains of discourse. More simply, an ontology is a way of showing the properties of a subject area and how they are related, by defining a set of concepts and categories that represent the subject.

SUMMARY

According to one or more embodiments of the present invention, a computer-implemented method for optimizing a window-size for an input request that is sent to a natural language processing (NLP) system includes selecting, by a processor, a window-size for identifying entities in an input corpus, the input corpus being divided into a plurality of partitions of the window-size, each partition being processed separately. The method further includes identifying, by the processor, a first set of entities in a first partition. The method further includes identifying, by the processor, a second set of entities in a second partition. The method further includes determining, by the processor, a third partition that comprises a first segment and a second segment, the first segment overlaps the first partition, and the second segment overlaps the second partition. The method further includes identifying, by the processor, a third set of entities in the third partition. The method further includes in response to the third set of entities being distinct from a set of entities corresponding to the first segment and the second segment, adjusting, by the processor, the window-size, and generating, by the processor, the input request for the NLP system using the window-size that has been adjusted.

In one or more embodiments of the present invention, the first partition and the second partition are consecutive partitions. Also, in one or more embodiments of the present invention, the first segment in the third partition is based on an overlap-size.

In one or more embodiments of the present invention, adjusting the window-size includes decreasing the window-size. Alternatively, adjusting the window-size comprises increasing the window-size.

In one or more embodiments of the present invention, the processor is part of the NLP system. In one or more embodiments of the present invention, the processor receives the input request for annotating the input corpus, and in response, generates a plurality of input requests based on the window-size that is adjusted, and sends, to the NLP system, the plurality of input requests.

In one or more embodiments of the present invention, the processor receives, from a user computer system, a request for determining the window-size for annotating the input corpus, and in response, outputs the window-size that is adjusted to the user computer system for generating the input request for the NLP system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
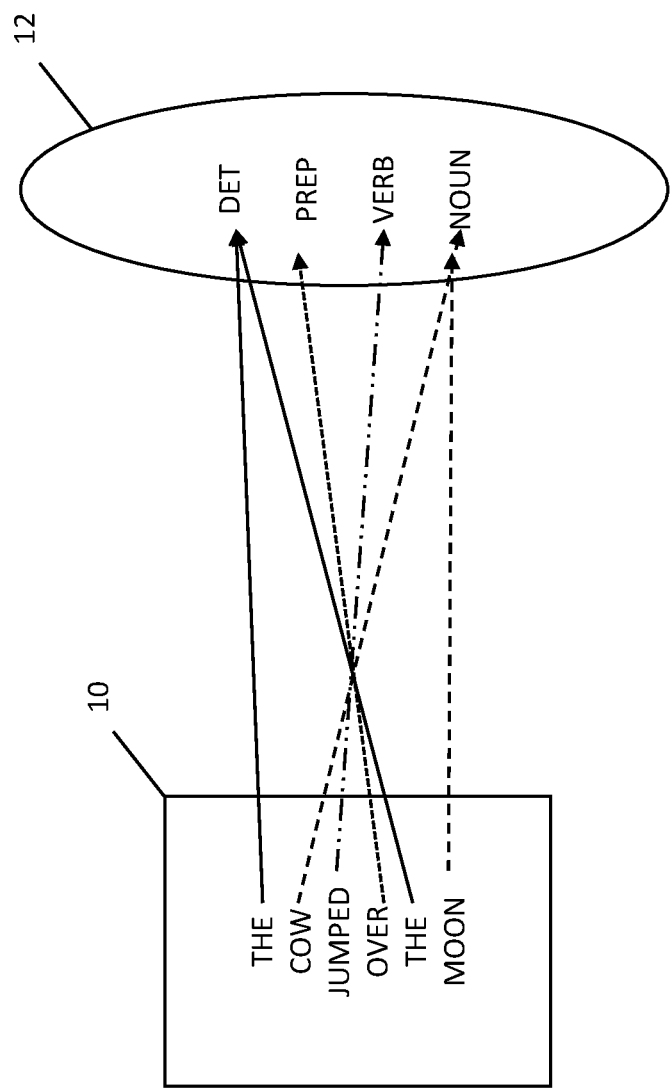
FIG. 1 depicts an example tagging of parts of speech in a sentence according to one or more embodiments of the present invention.

One or more embodiments of the present invention provide a technique of configuring a natural language processing (NLP) system that is to be used for identifying entities from a corpus. The configuration determines a window-size that is to be used by the NLP system when the NLP system is performing one or more operations during the natural language processing, such as entity identification, annotation, semantic search, type ahead, and/or any other operations. The "window-size" dictates a number of words, characters, or any other such parameter that defines how much data is processed by the NLP system when performing the entity identification/extraction. The amount of data used by the NLP system plays an important role, because the NLP system identifies entities using contextual information. Accordingly, using lesser (or more data) can provide a different context to the NLP to perform such entity identification. Here, an "entity" can include actors, objects, places, time, or other concepts that are identified in the corpus, and one or more relations among such concepts. In one or more embodiments of the present invention, an input data is partitioned automatically in an optimal manner to facilitate annotating the input data by identifying entities in the input data.

Today, computers are used to store and access "big data" that can contain information in all forms of media including texts, images, movies, and sounds. Language is the communication medium that allows humans, i.e., users, to understand the content, and to link the content to other media. However, while computers are excellent at delivering this information to interested users, it is a technical challenge to have computers to understand the language itself. NLP and various machine learning (ML) algorithms have been and are being developed to address such a linguistic technical challenge. Such linguistic modeling problems are addressed by performing ML tasks that handle big data, rather than limited to the relatively small amounts of data that humans are able to process on their own. However, to address the technical challenge of training the computer(s) to understand natural language using ML algorithms, a technical challenge to be addressed is that the data has to be prepared in such a way that the computer can more easily find patterns and inferences in it. This is usually done by adding relevant metadata to a dataset. Any metadata tag used to markup elements of the dataset is called an annotation over the input. However, in order for the algorithms to learn efficiently and effectively, the annotation done on the data must be accurate, and relevant to the task the machine is being asked to perform. For this reason, the discipline of language annotation is a critical link in developing intelligent human language technologies.

Datasets of natural language are referred to as corpora, and a single set of data annotated with the same specification is called an annotated corpus. Annotated corpora can be used to train ML algorithms. ML algorithms can be used for various NLP applications including, but not limited to question answering systems (QAS), summarization, machine translation, speech recognition, and document classification. As one example of the increasing availability of data, Google® has recently released the Google® Ngram Corpus. The Google® Ngram dataset allows users to search for single words (unigrams) or collocations of up to five words (5-grams). N-grams are sets of items (often words, but they can be letters, phonemes, etc.) that are part of a sequence. By examining how often the items occur together their usage in a language can be determined, and predictions can be made about what would likely follow a given sequence (using n-grams for this purpose is called n-gram modeling). N-grams are applied in a variety of ways every day, such as in websites that provide search suggestions once a few letters are typed in, and for determining likely substitutions for spelling errors. They are also used in speech disambiguation—if a person speaks unclearly but utters a sequence that does not commonly (or ever) occur in the language being spoken, an n-gram model can help recognize that problem and find the words that the speaker probably intended to say.

The Ngram dataset consists of more than one trillion tokens (words, numbers, etc.) taken from publicly available websites and sorted by year. Another modern corpus is ClueWeb09, a dataset "created to support research on information retrieval and related human language technologies. It consists of about 1 billion web pages in ten languages that were collected in January and February 2009." This corpus is too large to use for an annotation project (it's about 25 terabytes uncompressed), but some projects have taken parts of the dataset (such as a subset of the English websites) and used them for research. Data collection from the Internet is an increasingly common way to create corpora, as new and varied content is always being created. With so much data, annotating such corpus is a computationally intensive task, and not a task that is practically performed by a human.

To further add to the complexity, different parts of a language's syntax can be annotated. These include part of speech (POS), phrase structure, and dependency structure. There are many different tag sets for the parts of speech of a language that you can choose from.

The POS tagging process involves assigning the right lexical class marker(s) to all the words in a sentence (or corpus). This is illustrated in by a POS tagging example shown FIG. 1. Here words from a sentence 10, "The cow jumped over the moon," are tagged using a set of tags 12 that identify the separate POS. Identifying the correct parts of speech in a sentence is a necessary step in building many natural language applications, such as parsers, Named Entity Recognizers, QAS, and Machine Translation systems. It is also an important step toward identifying larger structural units such as phrase structure. It is understood that although the examples described herein use the English language, similar annotation can be performed for corpus in other languages.

Figure 2:
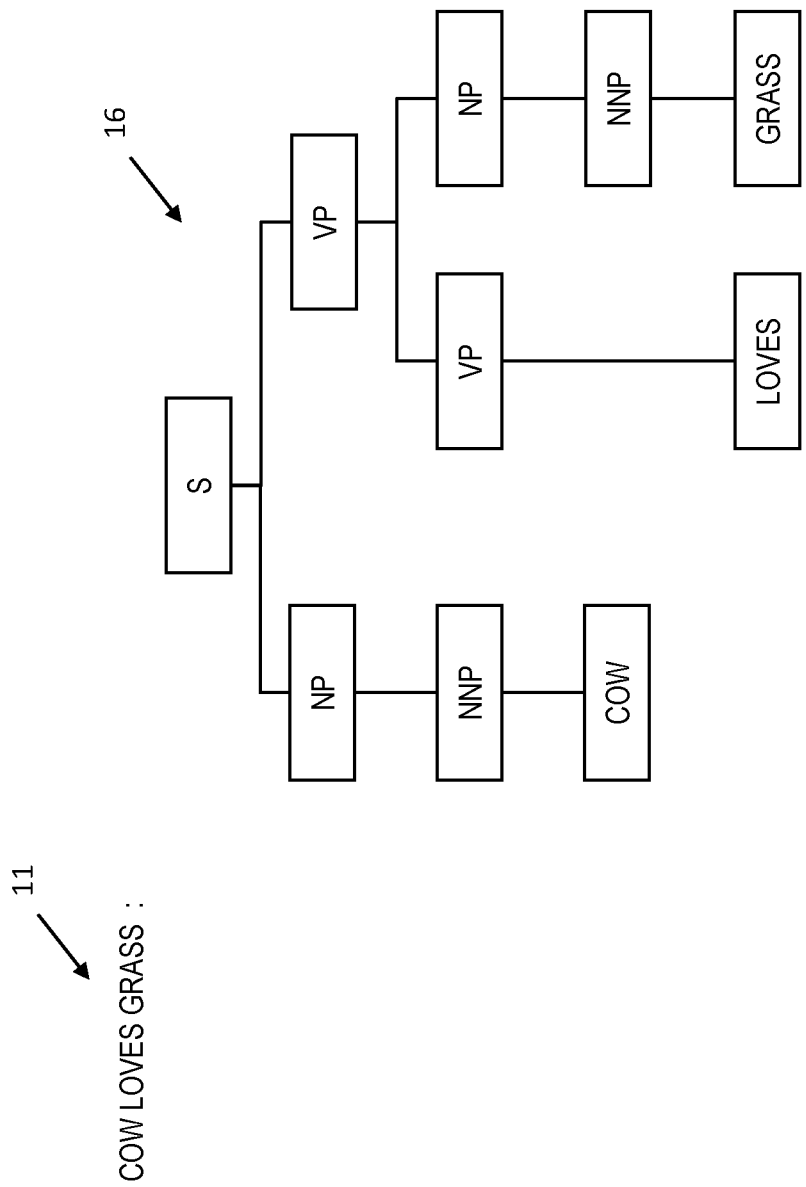
FIG. 2 depicts a bracketed representation of a syntactic tree structure according to one or more embodiments of the present invention.

While words in a sentence can be annotated with labels (the POS tags 12), specific sequences of words can also be annotated, using syntactic bracketing (or labeling). The syntactic bracketing determines the structure that organizes all the words into coherent phrases. Here, "syntax" is the name given to the structure associated with a sentence. The syntactic bracketing provides two relations between the words in a sentence: order (precedence) and hierarchy (dominance). FIG. 2 depicts a bracketed representation of a syntactic tree structure. In the depicted example, the tree 16 captures the precedence and dominance relations for a sentence 11 "Cow loves grass." The precedence and dominance relations in this case (using the standard Penn Treebank's notation) are:

{Dom(NNP1,Cow), Dom(VPZ,loves), Dom(NNP2,grass), Dom(NP1,NNP1), Dom(NP2,NNP2), Dom(S,NP1), Dom(VP,VPZ), Dom(VP,NP2), Dom(S,VP),
Prec(NP1,VP), Prec(VPZ,NP2)}

It is understood that other types of syntactic bracketing can be performed that is different from the examples herein.

Figure 3:
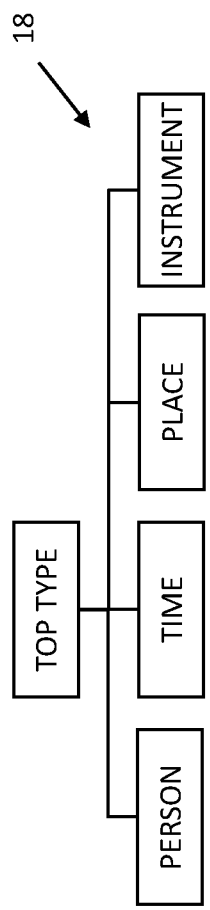
FIG. 3 depicts an example ontology that is used to annotate an input according to one or more embodiments of the present invention.

In addition to POS tagging and syntactic bracketing, it is useful to annotate texts in a corpus for their semantic value, that is, what the words mean in the sentence. Typically, two kinds of annotation are performed for semantic content within a sentence: what something is ("semantic typing"), and what role something plays ("semantic role"). FIG. 3 depicts an example ontology that is used to annotate an input. It is understood that the example ontology 18 that is depicted only contains four different labels for illustration purposes, however, typical ontologies that are used by one or more embodiments of the present invention can include thousands, or even more labels, making it very difficult, if not impractical, to perform annotation manually, particularly with a large corpus. For example, the ontology 18 applied to a sentence "Mary played guitar in the park at 6 pm" provides: [Mary]$_{person}$ played [guitar]$_{instrument}$ in [the park]$_{place}$ at [6 pm]$_{time}$.

It should be noted that the ontology used by an annotator varies based on the domain in which the NLP system is being used. For example, the ontology for an annotator that is tagging/labelling/identifying parts of a corpus in the pharmaceutical field will vary from another ontology that is used to distinguish whether email messages are spam or not.

Although it is recognized as a challenge to use the "correct" window-size to facilitate the NLP system to identify the entities in the corpus, window-sizes are typically dictated by other factors. For example, the window-size can be a predetermined value for the NLP system. Alternatively, or in addition, the window-size can be limited by a set of predetermined values provided by an application programming interface of the NLP system. Alternatively, or in addition, the amount of data that is sent in one window can be limited by the network that is being used, for example, because of a limit on how much data can be sent as part of a transaction. Further yet, in some NLP systems, the amount of data processed can be priced per character/words being sent. Accordingly, users of the NLP system can arbitrarily select window-sizes that in an attempt to limit costs. However, such attempts at cost saving can lead to faulty entity identification.

For example, consider the sentence "The children love cream biscuits only when children are less than 10 years old." Here, if only the words "The children love cream," is processed the NLP system may identify and extract as entities: children (actor), love (relation), cream (actor). Whereas, by providing additional data, i.e., the missing word 'biscuit' the NLP can identify/extract entities in a different context as: children (actor), love (relation), and cream biscuit (actor). In another example with the above sentence, consider that the NLP system is provided the sentence in two windows: "The children love cream biscuits only" and "when children are less than 10 years old." Here, the NLP system can conclude with entities children (actor), loves (relation), cream biscuit (actor), and children (actor) are less than 10 years old (relation). Here, the NLP system can miss the conditional relation provided by "only." It should be noted that the sentence provided here is just an example for explanation, and that typically, the NLP system will be provided a much larger corpus (hundreds of thousands of documents) to analyze rather than a sentence like above. Accordingly, using an "incorrect" window-size can lead to a number of missed entities, and this number can be higher in larger corpus. Such missed entities are referred to as "evidence loss" in some cases.

Embodiments of the present invention provide technical solutions that address such technical challenges. In one or more embodiments of the present invention, an input data is partitioned automatically in an optimal manner to facilitate annotating the input data by identifying entities in the input data. Embodiments of the present invention provide a machine learning algorithm that can measure and minimize the evidence loss due to discontinuities caused by window-sizes. One or more embodiments of the present invention provide a stateless algorithm which can be used in very large documents (hundreds of thousands of words). Embodiments of the present invention accordingly facilitates detecting concepts/entities across data that is partitioned to adhere to content size restrictions within an NLP service/process.

Figure 4:
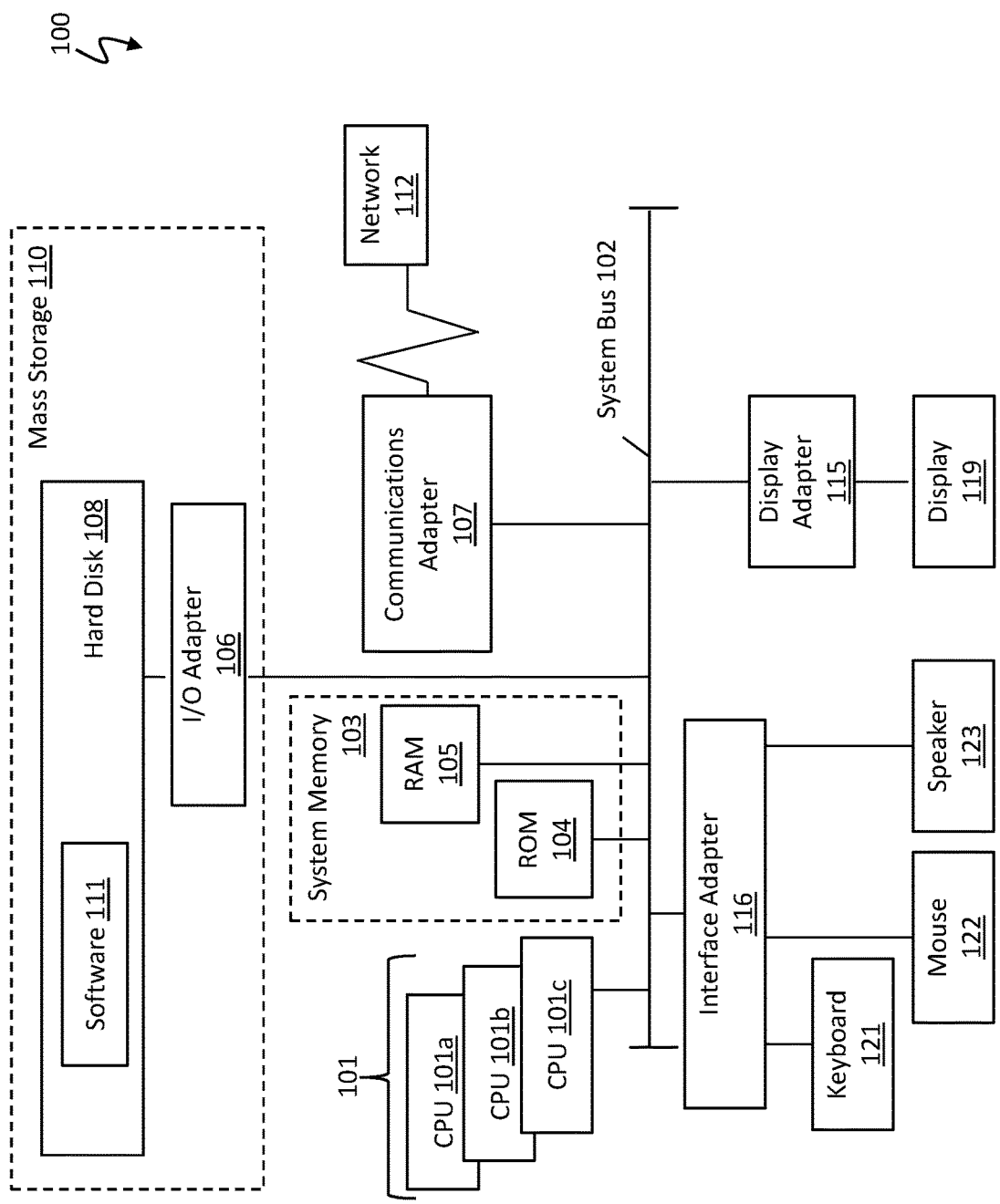
FIG. 4 depicts a block diagram of an example computer system for use in conjunction with one or more embodiments of the present invention.

Turning now to FIG. 4, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 4.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 4, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 4 is not intended to indicate that the computer system 100 is to include all of the components shown in FIG. 4. Rather, the computer system 100 can include any appropriate fewer or additional components not illustrated in FIG. 4 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 5:
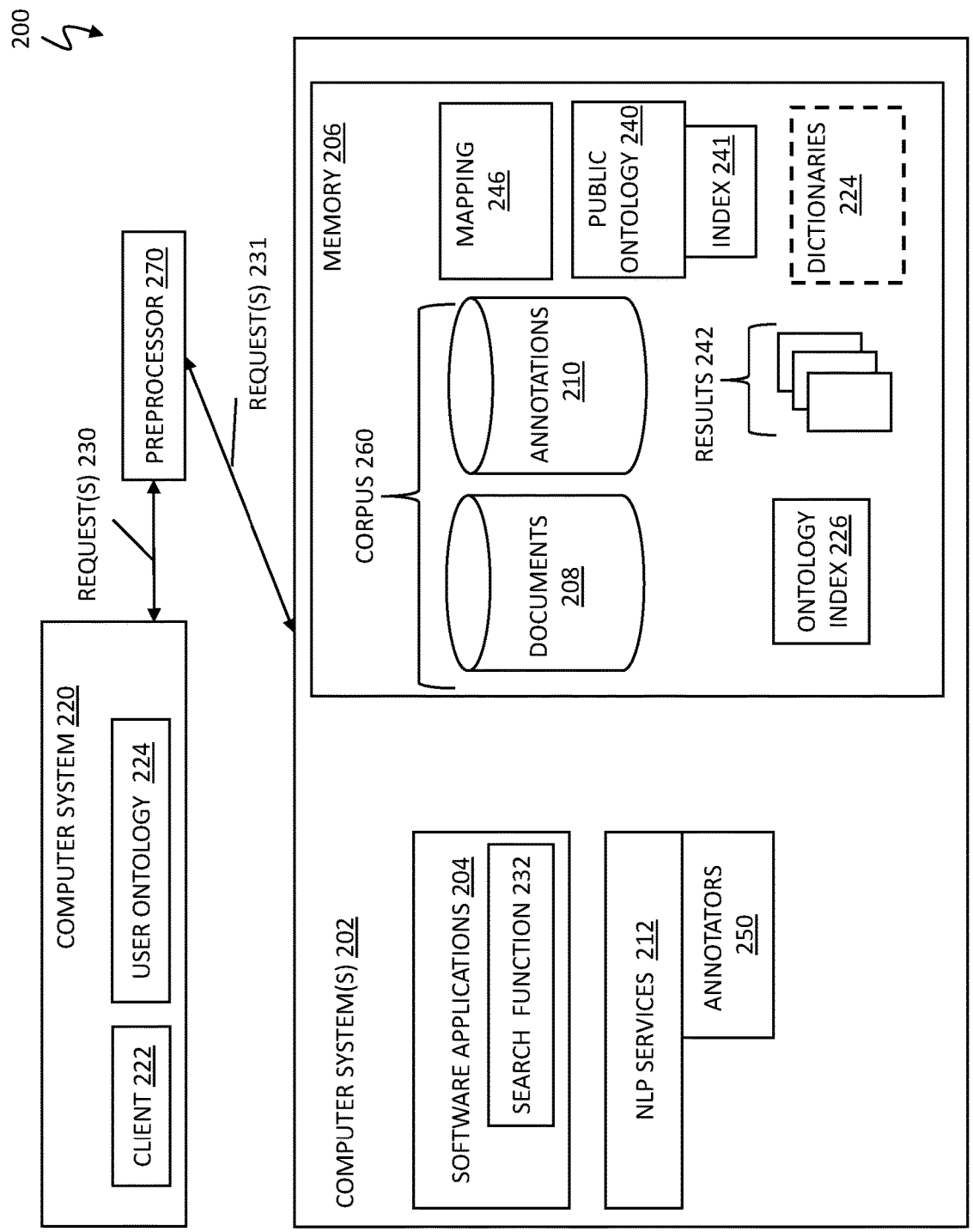
FIG. 5 is a block diagram of a system 200 that performs NLP according to one or more embodiments of the present invention.

FIG. 5 is a block diagram of a system 200 that performs NLP according to one or more embodiments of the present invention. FIG. 5 depicts one or more computers systems 202 coupled to computer system 220. Computer systems 202 can be representative of numerous computers in a datacenter servicing various users. Computer system 220 can be representative of numerous user computers requesting customized access to resources on computer systems 202. Elements of computer system 100 may be used in and/or integrated into computers system 202 and computer system 220.

Figure 6:
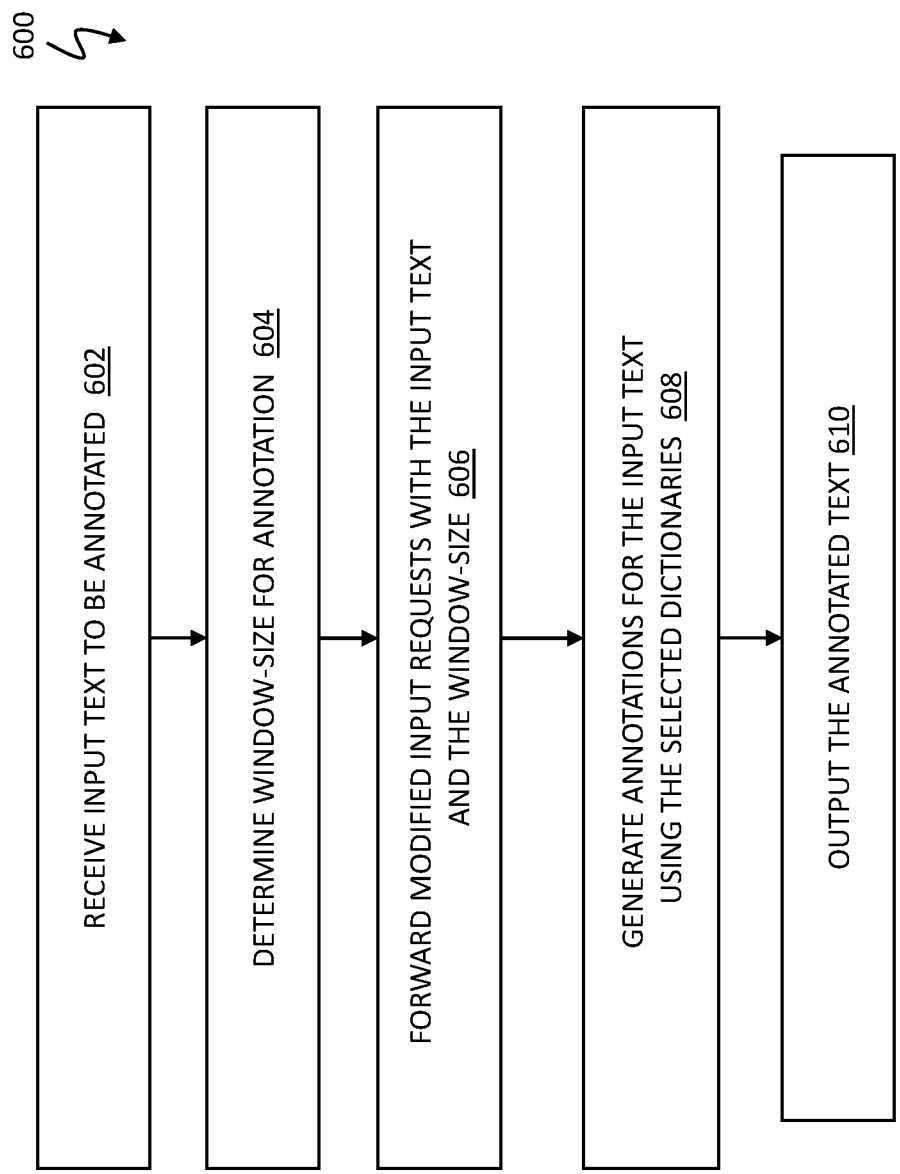
FIG. 6 illustrates a flowchart of a method for configuring a window-size to be used by a computer system when performing NLP services on an input text in accordance with one or more embodiments of the present invention.

FIG. 6 illustrates a flowchart of a method for configuring a window-size to be used by the computer system 202 when performing NLP services 212 on an input text in accordance with one or more embodiments of the present invention. The method 600 is now described with reference to FIG. 5.

At block 602, the computer system 220 sends one or more requests 230 for annotating text, referred herein as the "input text." In one or more embodiments of the present invention, the software application 204 on computer system 202 is configured to receive the requests 230 for annotating text. In one or more embodiments of the present invention, the computer system 202 provides one or more NLP services 212 that can be accessed via an application programming interface. The computer system 202 can be referred to as an NLP system in some cases.

The computer system 220 can be a system for the user, who may also be referred to as the customer, client, etc. Computer system 220 can communicate with computer systems 202 over a wired and/or wireless network. Using computer system 220, the user can interface with software application 204 of computer system 202 and/or use a client application 222 to interface with software application 204. Software application 204 may be implemented as software 111 executed on one or more processors 101, as discussed in FIG. 4. Similarly, client application 222 may be implemented using software 111 configured to execute on one or more processors 101. Client application 222 may include cookies, plug-ins, etc., and client application 222 may serve as a piece of computer software that accesses the NLP services 212 for corpus 260 made available by computer system 202.

Corpus 260 on computer system 202 is available to the public for semantic search in which one or more ontologies 240 are used for the semantic search. Corpus 260 has been enriched by one or more NLP services 212 using one or more ontologies 240. Corpus 260 includes databases of numerous documents 208 and annotations 210 about those documents 208. Corpus 260 may contain hundreds, thousands, and/or millions of documents, also referred to as "big data." In accordance with one or more embodiments, the enormous size of corpus 260 requires management, processing, and search by a machine (such as computer system 202), for example, using computer-executable instructions, and corpus 260 could not be practically managed, stored, analyzed, and/or processed as discussed herein within the human mind.

For corpus 260, NLP processing via one or more NLP services 212 using annotators 250 has occurred on documents 208 resulting in annotations 210 associated with the text of documents 208. NLP services 212 used one or more ontologies 240 to generate annotations 210 thereby enriching corpus 260. Ontologies 240 represent one or more public and/or private ontologies that are to be used with corpus 260. To enrich corpus 260, NLP services 212 are configured to index the documents 208, and while using the index of documents 208 along with public ontologies 240, NLP services 212 are configured to find insights and relationships in the text of documents 208 and output this information as annotations 210 (or metadata) associated with documents 208.

The rule-based annotators 250 use a set of one or more dictionaries 224 to initiate the annotator analysis. A dictionary 224 includes the tags 12 that are to be used by the annotators 250 when determining one or more parts of the input text. Typically, depending on the subject for which the NLP system 202 is being used, the annotators 250 is configured to use a single dictionary where all possible tags 12 are stored. For example, in the case that the annotators 250 are being used to determine pharmaceuticals, their use in treatments of specific diseases, the dictionary 224 specifically includes tags 12 for terms used in this context. For example, the dictionary 224 can be DRUG_NAMES, where all possible drug names/brands are stored.

At block 604, the input requests 230 is preprocessed to determine a window-size to be used to annotate the entities in the input text. In one or more embodiments of the present invention, a preprocessor 270 determines the window-size. The preprocessor 270, although shown as a separate block, can be part of the computer system 202 or the computer system 220 in one or more embodiments of the present invention. The preprocessor 270 can be a computer system by itself in one or more embodiments of the present invention. The preprocessor 270 receives the input requests 230 from the computer system 220, determines the window-size for the input text to be annotated.

Figure 7:
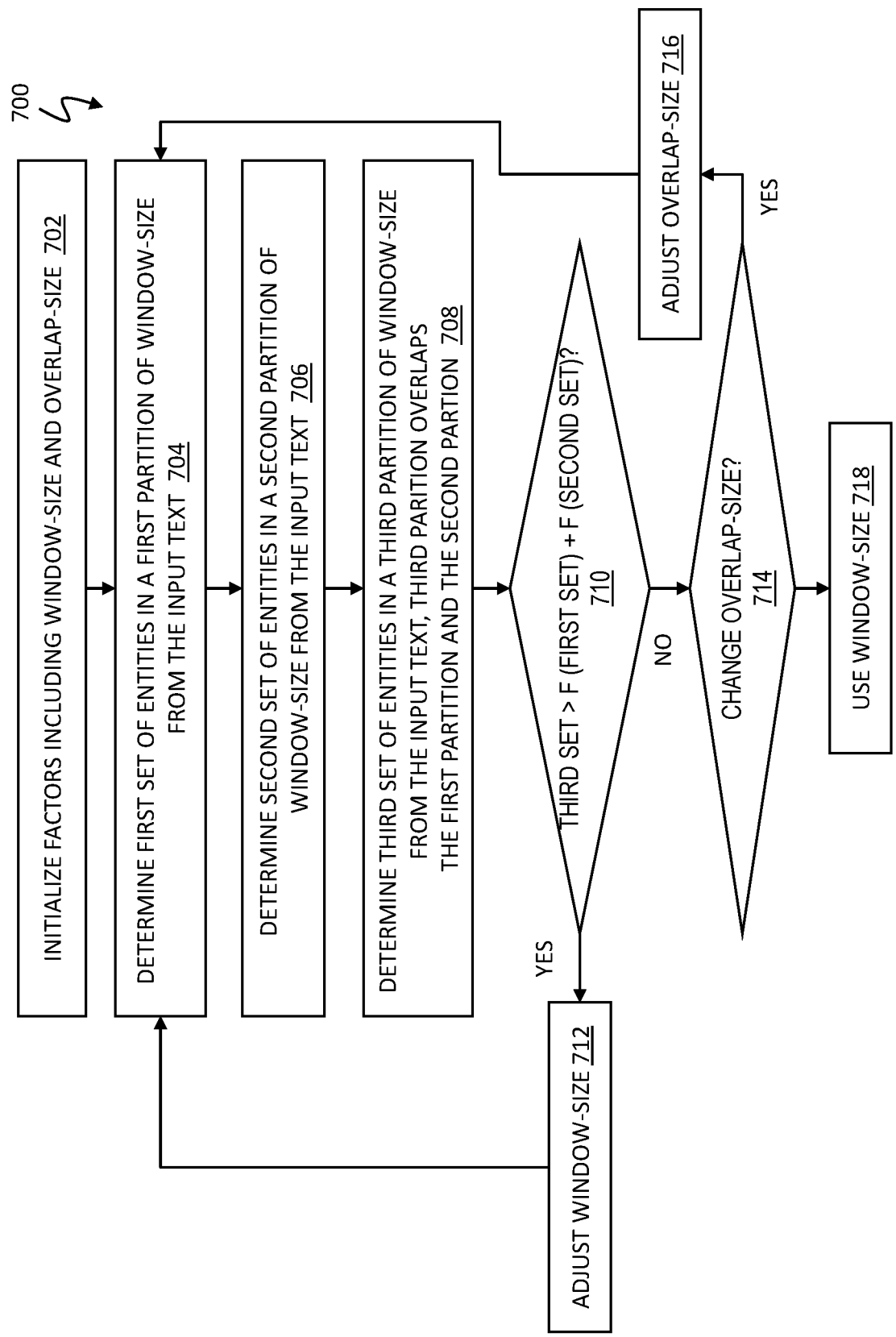
FIG. 7 depicts a flowchart for a method to dynamically determine an optimal window-size to use for entity annotation by an NLP system according to one or more embodiments of the present invention.

FIG. 7 depicts a flowchart for a method to dynamically determine an optimal window-size to use for entity annotation by an NLP system according to one or more embodiments of the present invention. The method 700 that is depicted implements a machine learning algorithm that can measure and minimize the "evidence loss" due to partition discontinuities that can be caused by arbitrary window-sizes. The method 700 provides a stateless algorithm which can be used in very large documents.

At block 702, one or more factors are initialized, including a window-size, and an overlap-size. The window-size defines a number of logic blocks, such as characters, words, sentences, paragraphs, pages, etc., in each partition from the input text of the input request 230, where each partition is separately provided to the NLP system (202) for annotating. It should be noted that the document may not be physically, or electronically partitioned, rather each partition is extracted from the input text and forwarded for annotation by the computer system 202.

The overlap-size is a parameter that can be a predetermined value, for example, 50%, 60%, etc. In one or more embodiments of the present invention, several values of the overlap-size are used by the method 700 in each iteration, as will be described further.

At block 704, the preprocessor 270, for the input request 230 determines a first set of entities in a first partition, the first partition being a first set of words (or characters) using the present window-size. Determining the entities can include the preprocessor 270 executing a separate input request with only the first partition as input text.

At block 706, the preprocessor 270, for the input request 230 determines a second set of entities in a second partition, the second partition being a second set of words (or characters) using the present window-size. Determining the entities can include the preprocessor 270 executing a separate input request with only the second partition as input text. It should be noted that the first partition and the second partition are consecutive partitions, i.e., consecutive sets of words from the overall input text from the input request 230.

At block 708, the preprocessor 270 determines a third set of entities in a third partition. The third partition is a set of overlapping words (or characters) from the first partition and the second partition. The number of words (or characters), from the first partition (or the second partition), to be included in the third partition is defined by the overlap-size.

Figure 8:
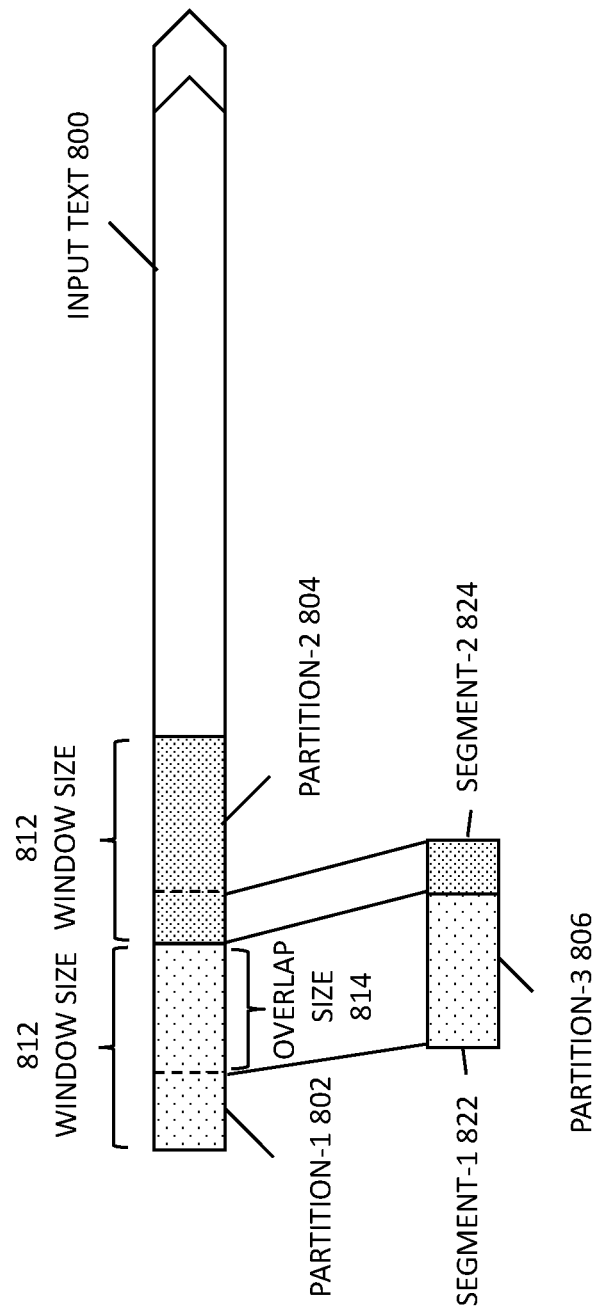
FIG. 8 visualizes the partitions used by a preprocessor to dynamically determine the window-size according to one or more embodiments of the present invention.

FIG. 8 visualizes the partitions used by the preprocessor to dynamically determine the window-size according to one or more embodiments of the present invention. The first partition 802, the second partition 804 are selected from the input text 800. The first partition 802 and the second partition 804 are of the window-size 812. As noted, the window-size 812 can be a predetermined value that defines an initial size of the partition. The window-size 812 can be dynamically adjusted in one or more embodiments of the present invention. The third partition 806 overlaps both, the first partition 802 and the second partition 804, based on the overlap-size 814. The overlap-size can be a predetermined value. For example, the third partition 806 contains a first segment 822 from the first partition 802 and a second segment 824 that is from the second partition 804. The segments (822, 824) in the third partition 806 that overlap the first partition 802, and the second partition 804 may or may not be equal, depending on the overlap-size 814, and the window-size 812. In some cases, the first segment 822 and the second segment 824 may be of the same size, for example, if the overlap-size is 50% of the window-size.

At block 710, the evidence found, i.e., the identified set of entities, in the third set, referred to as the "window chunk," is compared with the results of the first set and second set, but only accounting for the text segments (822, 824) contained in the window chunk, i.e., the third partition 806. If the window chunk produces a set of entities that is distinct from the set of entities identified in the first segment 822 and the second segment 824, the window-size 812 is adjusted. For example, if more entities are identified in the window chunk compared to the sum of entities in the corresponding segments (822, 824) from the first partition 802 and the second partition 804, it can be deemed that entities exists across the data which were not captured with the initial window-size 812. The corresponding segments (822, 824) can be determined as a function of the first partition 802 and the second partition 804 respectively, using the overlap-size 814 and window-size 812 as the parameters. Accordingly, at block 712, the window-size 812 is decreased (or increased). The decrement/increment can be a predetermined value. The operations starting from the block 704 are repeated with the new window-size. Such iterations can be continued until the window chunk does not produce more entities than the corresponding text segments (822, 824).

If the window chunk does not produce more entities than the corresponding text segments, the overlap-size 814 can be increased (or decreased), at blocks 714 and 716, in one or more embodiments of the present invention. The operations starting from the block 704 are repeated with the new overlap-size. The overlap-size 814 can be increased (or decreased) up to a predetermined limit.

Once all the overlap-size options have been exhausted, at block 718, the present window-size 812 is used to partition the input text and feed the resulting partitions to the computer system 202 for the NLP annotating. In one or more embodiments of the present invention, the preprocessor 270 generates modified input requests 231, in which the input text is partitioned based on the window-size 812 that is determined. Alternatively, or in addition, the modified input requests 231 pass the input text and the window-size 812 that is determined to the computer system 202, which partitions the input text using the window-size 812. In yet another embodiment (not shown), the preprocessor 270 outputs the window-size 812 to the computer system 220, which partitions the input text according to the window-size 812 and sends the modified input requests 231 with such partitions.

The window-size 812 can thus be optimized, by finding the smallest window overlap that still produces the same results as the original set point. The optimization saves resources as the preprocessor 270 may find that an overlap of 10% is enough for the input text.

Referring to the method 600 in the FIG. 6, at block 606, the preprocessor 270 forwards modified input requests 231 that includes the input text and the window-size to the computer system 202.

The annotator 250 analyzes the input text using the dictionaries 224, by parsing rule implementations and generating the annotations 210 for the input text, at block 608. The annotator 250 can use neural networks, types of disambiguation modules, etc. that generate the annotations 210 for the input text using the dictionaries 224. The annotator 250 returns annotated text back to the computer system 220 with the matching annotations 210, at block 610. Further, software application 204 can utilize one or more portions of annotations 210 when performing one or more operations.

Embodiments of the present invention facilitate optimizing a window-size that is being used for NLP entity extraction or annotation. One or more embodiments of the present invention addresses the technical challenge of fragmentation of NLP requests by identifying the window-size that can reduce evidence loss during entity identification and extraction. One or more embodiments of the present invention provide a machine learning based technique to determine the size of a sliding window. It should be noted that embodiments of the present invention facilitate dynamically learning the optimal window-size and effectiveness for streamed NLP data, without prior knowledge of the input text (i.e., provides a stateless algorithm). Accordingly, embodiments of the present invention facilitate NLP for large data streams, which are chunked/partitioned before inputting into an NLP system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
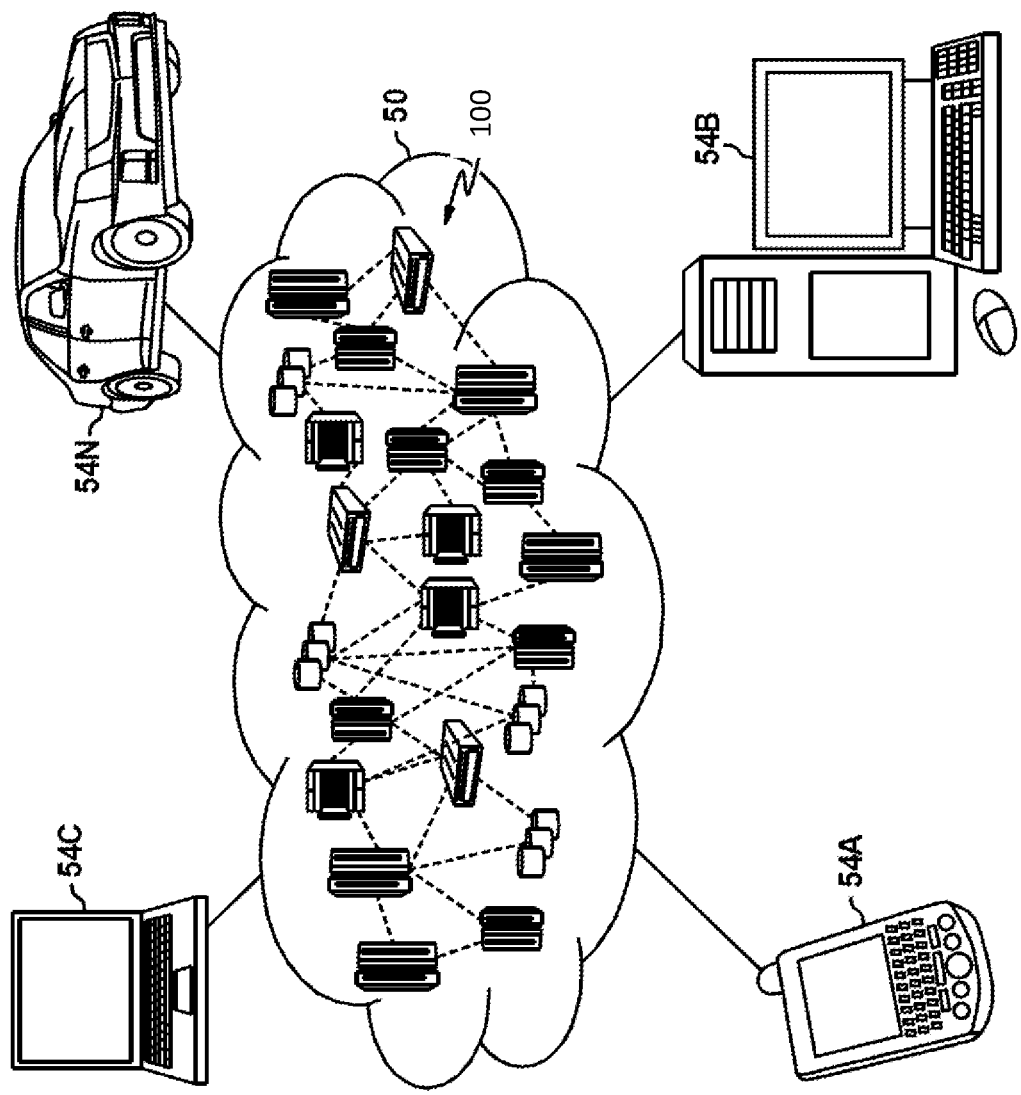
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
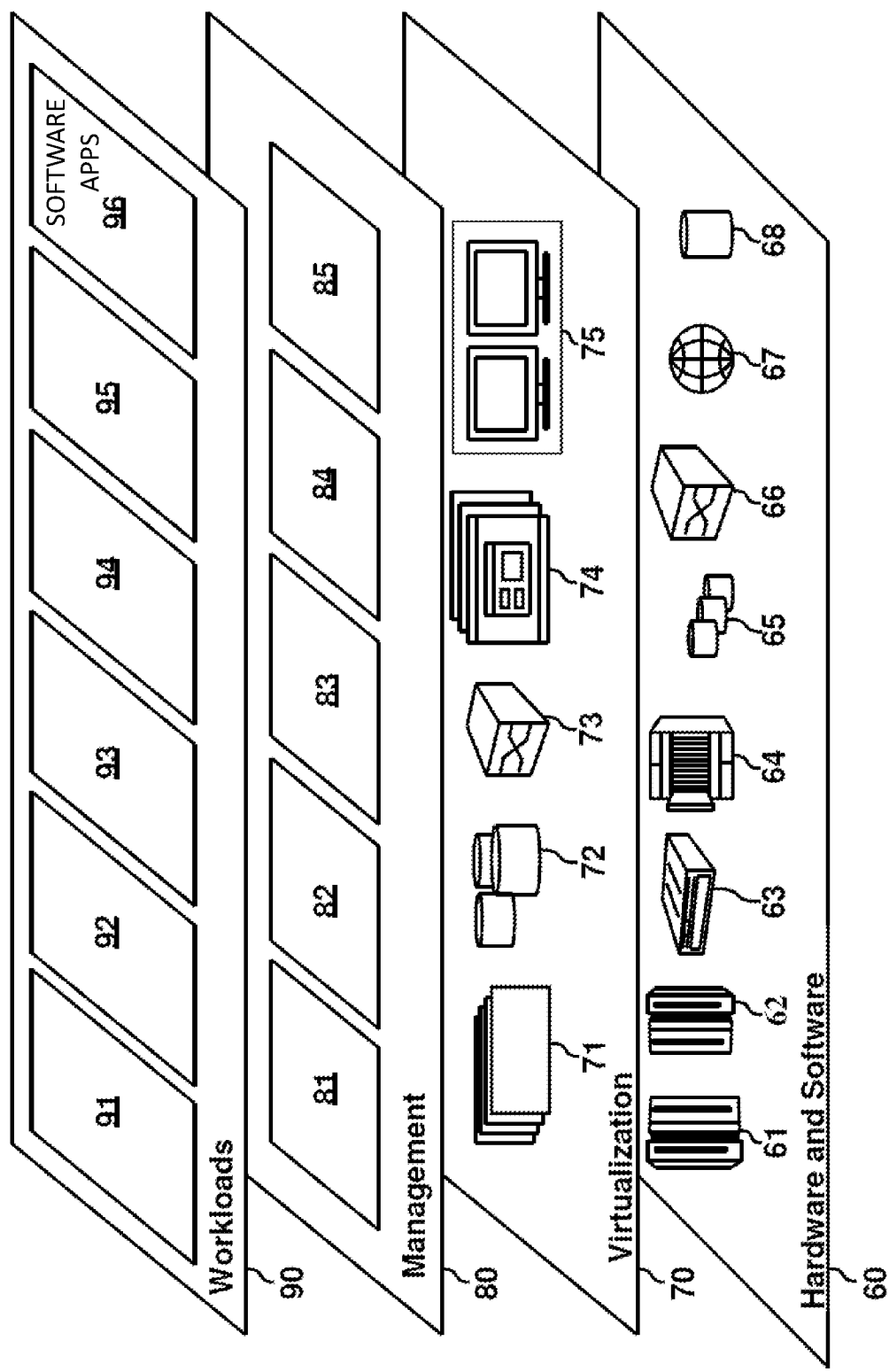
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204 and typeahead search function 232) implemented in workloads and functions 96. Also, software applications can function with and/or be integrated with resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk™, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing a window-size for an input request that is sent to a natural language processing (NLP) system, the method comprising:
    selecting, by a processor, a window-size for identifying entities in an input corpus, the input corpus being divided into a plurality of partitions of the window-size, each partition being processed separately;
    identifying, by the processor, a first set of entities in a first partition;
    identifying, by the processor, a second set of entities in a second partition;
    determining, by the processor, a third partition that comprises a first segment and a second segment, the first segment overlaps the first partition, and the second segment overlaps the second partition;
    identifying, by the processor, a third set of entities in the third partition;
    determining the third set of entities is distinct from a set of entities corresponding to the first segment and the second segment;
    adjusting, by the processor, the window-size based on determining the third set of entities is distinct, determining the third set of entities is no longer distinct from the set of entities corresponding to the first segment and the second segment based on the adjusting the window-size, wherein the third set of entities is determined to be no longer distinct when the window-size produces a smallest overlap between the third partition and the first partition providing the same results; and
    generating, by the processor, the input request for the NLP system using the window-size that has been adjusted.

2. The computer-implemented method of claim 1, wherein the first partition and the second partition are consecutive partitions.

3. The computer-implemented method of claim 1, wherein the first segment in the third partition is based on an overlap-size.

4. The computer-implemented method of claim 1, wherein adjusting the window-size comprises decreasing the window-size.

5. The computer-implemented method of claim 1, wherein adjusting the window-size comprises increasing the window-size.

6. The computer-implemented method of claim 1, wherein the processor is part of the NLP system.

7. The computer-implemented method of claim 1, wherein the processor receives the input request for annotating the input corpus, and in response:
    generates a plurality of input requests based on the window-size that is adjusted; and
    sends, to the NLP system, the plurality of input requests.

8. The computer-implemented method of claim 1, wherein the processor receives, from a user computer system, a request for determining the window-size for annotating the input corpus, and in response, outputs the window-size that is adjusted to the user computer system for generating the input request for the NLP system.

9. A system comprising:
    a memory having computer readable instructions; and
    one or more processors for executing the computer readable instructions, the computer readable instructions controlling the one or more processors to perform operations comprising:
        selecting a window-size for identifying entities in an input corpus, the input corpus being divided into a plurality of partitions of the window-size, each partition being processed separately;
        identifying a first set of entities in a first partition;
        identifying a second set of entities in a second partition;
        determining a third partition that comprises a first segment and a second segment, the first segment overlaps the first partition, and the second segment overlaps the second partition;

identifying a third set of entities in the third partition;

determining the third set of entities is distinct from a set of entities corresponding to the first segment and the second segment;

adjusting the window-size based on determining the third set of entities is distinct, determining the third set of entities is no longer distinct from the set of entities corresponding to the first segment and the second segment based on the adjusting the window-size, wherein the third set of entities is determined to be no longer distinct when the window-size produces a smallest overlap between the third partition and the first partition providing the same results; and generating the input request for the NLP system using the window-size that has been adjusted.

10. The system of claim 9, wherein the first partition and the second partition are consecutive partitions.

11. The system of claim 9, wherein the first segment in the third partition is based on an overlap-size.

12. The system of claim 9, wherein adjusting the window-size comprises decreasing the window-size.

13. The system of claim 9, wherein adjusting the window-size comprises increasing the window-size.

14. The system of claim 9, wherein the one or more processors receive the input request for annotating the input corpus, and in response:

generate a plurality of input requests based on the window-size that is adjusted; and send, to the NLP system, the plurality of input requests.

15. The system of claim 9, wherein the one or more processors are part of the NLP system.

16. A computer program product comprising a computer readable storage medium having program instructions embodied therewith, the program instructions executable by a processor to cause the processor to perform operations comprising:

selecting a window-size for identifying entities in an input corpus, the input corpus being divided into a plurality of partitions of the window-size, each partition being processed separately;

identifying a first set of entities in a first partition;

identifying a second set of entities in a second partition;

determining a third partition that comprises a first segment and a second segment, the first segment overlaps the first partition, and the second segment overlaps the second partition;

identifying a third set of entities in the third partition;

determining the third set of entities is distinct from a set of entities corresponding to the first segment and the second segment;

adjusting the window-size based on determining the third set of entities is distinct, determining the third set of entities is no longer distinct from the set of entities corresponding to the first segment and the second segment based on the adjusting the window-size, wherein the third set of entities is determined to be no longer distinct when the window-size produces a smallest overlap between the third partition and the first partition providing the same results; and generating the input request for the NLP system using the window-size that has been adjusted.

17. The computer program product of claim 16, wherein the first partition and the second partition are consecutive partitions.

18. The computer program product of claim 16, wherein the first segment in the third partition is based on an overlap-size.

19. The computer program product of claim 16, wherein adjusting the window-size comprises decreasing the window-size.

20. The computer program product of claim 16, wherein adjusting the window-size comprises increasing the window-size.

* * * * *